C. E. YATES.
PIPE COUPLING.
APPLICATION FILED FEB. 7, 1917.

1,345,571.

Patented July 6, 1920.

Inventor:
Charles E. Yates,
by Milton Tibbetts,
Atty.

UNITED STATES PATENT OFFICE.

CHARLES E. YATES, OF DETROIT, MICHIGAN, ASSIGNOR, BY MESNE ASSIGNMENTS, TO THE ISKO COMPANY, OF CHICAGO, ILLINOIS, A CORPORATION OF DELAWARE.

PIPE-COUPLING.

1,345,571.　　　　Specification of Letters Patent.　　Patented July 6, 1920.

Application filed February 7, 1917. Serial No. 147,161.

*To all whom it may concern:*

Be it known that I, CHARLES E. YATES, a citizen of the United States, and resident of Detroit, Wayne county, State of Michigan, have invented certain new and useful Improvements in Pipe-Couplings, of which the following is a specification.

This invention relates to pipe couplings and particularly to couplings which may be readily coupled and uncoupled. It also relates to valved couplings.

The pipe coupling which forms the subject matter of this invention is particularly useful in connection with refrigerating apparatus. For instance, in an apparatus designed to be sold at retail for household use, which may be of the compression type and using sulfur dioxid as the refrigerant, it is desirable that one of the coils or receivers of the apparatus be charged with the gas under pressure before it leaves the factory and connected in place when the machine is set up. It is one of the objects of the present invention to provide a coupling for the piping of such apparatus such that the charge of gas will be securely retained in the coil or receiver until it is connected in place when the interior of the coil will be opened to the pipe or pipes to which it has been connected such as the pipe leading to the compressor or the one leading to the expansion valve.

Other objects of the invention will appear from the following description taken in connection with the drawing which forms a part of this specification, and in which.

Figure 1:
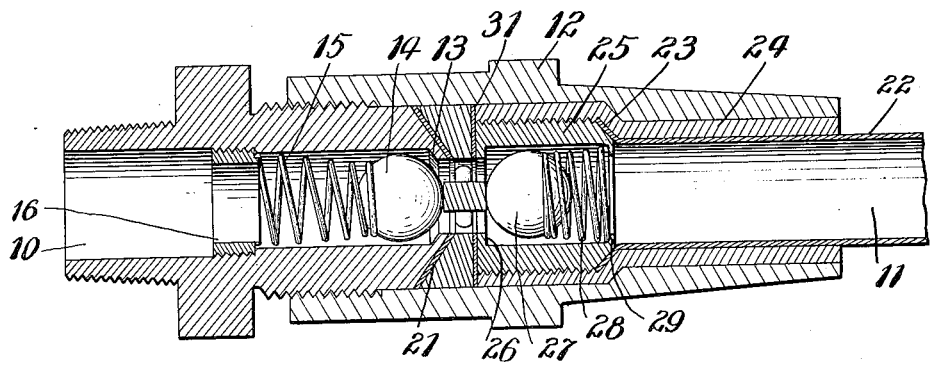
Figure 1 is a longitudinal sectional view through a pipe coupling embodying an illustrative form of this invention.

In the drawings there are two tubular or pipe members 10 and 11 which are adapted to be connected and fastened together by a coupling sleeve 12. The member 10 has a valve seat 13 and a valve 14, shown as a ball valve, and a spring 15 pressing the valve toward its seat. An annulus 16 is threaded into the member as shown to form an abutment for the inner end of the spring. Exteriorly this member 10 is formed with a hexagon portion 17 for a wrench and a threaded portion 18 which coöperates with the interior threaded portion 19 of the sleeve 12. Its end may be beveled a shown at 20 to form a seat for a gasket 21.

The member 11 is shown as formed of a metal tube 22 having its end flared as at 23. A tubular end piece 24 surrounds the end of the tube and a valve piece 25 is threaded into the piece 24 clamping the flared end 23 of the tube between them. The valve piece 25 has a seat 26 for a ball valve 27 pressed toward the seat by a spring 28. The spring and valve are retained in the piece 25 by a turned in flange 29 at one end of the piece 25 as shown in Fig. 1.

Figures 2, 3:
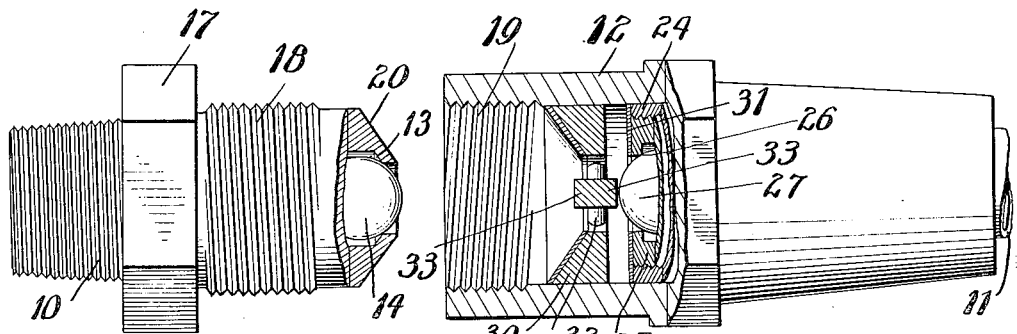
Figs. 2 and 3 are elevation views of the respective tube members disconnected, parts being broken away or shown in section.
Figure 4:
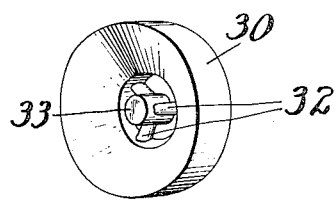
Fig. 4 is a perspective view of the valve releasing ring.

From the above it will be seen that each of the members is provided with a spring pressed check valve so that when they are disconnected the contents of the members, if under pressure, will be retained. The closed position of the valves is shown in Figs. 2 and 3 where the members are disconnected.

For the purpose of releasing or opening the valves when the coupling is made to thereby permit free passage of the gas or other contents of the members, a valve releasing ring 30 is provided and is shown as arranged in the sleeve 12 and between the ends of the members 10 and 11. This ring is beveled to fit the beveled end 20 of the member 10, the gasket 21 being arranged between the beveled surfaces, and another gasket 31 is placed between the other side of the ring and the end of the member 11. Thus the ring in a way forms a packing between the members 10 and 11, being clamped between the ends of these members. The ring has a spider 32 and a pair of fingers or lugs 33 that are arranged to contact with the valves 14 and 27 to positively release or open them as the tubular members are brought together to make the coupling. The result of this action of the fingers 33 is shown in Fig. 1 where both valves are open permitting free passage from one member to the other.

It will be understood that the first two or three unscrewing turns of the coupling sleeve 12 will permit the ring 30 to separate from the ends of the members 10 and 11 and allow the valves to close so that when the members are completely uncoupled their ends will be closed by the valves.

Other forms of the invention may be made within the scope of the claims.

Having thus described my invention what I claim and desire to secure by Letters Patent is:—

1. A pipe coupling comprising two valved members to be connected, means for coupling said members, and means clamped between said members for opening both said valves as said members are coupled.

2. A pipe coupling comprising valved members to be connected, a connecting and fastening member, and means slidable in said connecting and fastening member and arranged between the valved members for opening the valves as said latter members are coupled.

3. A pipe coupling comprising valved members to be connected, a connecting and fastening member, and a device slidably arranged in said connecting and fastening member for opening the valves as the members are coupled.

4. A pipe coupling comprising tubular valved members to be connected, a connecting sleeve surrounding the adjacent ends of said members, and a ring arranged in said sleeve and between the ends of said members and having means adapted to open said valves as the members are coupled.

5. A pipe coupling comprising a tube having a spring pressed check valve in the end thereof, a part to be connected to said tube, a coupling member for drawing and holding the tube and part together, and a ring arranged between said tube and part and forming a packing therebetween, said ring having a finger adapted to contact with said valve and open it as the coupling is drawn tight.

6. A pipe coupling comprising two tubular members to be connected, a spring pressed check valve in the ends of each of said members, a coupling sleeve swiveled on one of said members and having threaded engagement with the other of said members, and a ring arranged between the ends of said members and adapted to permit partial threaded connection of the coupling sleeve without affecting said valves and to act to open said valves as the coupling sleeve is threaded further on one of the tubular members.

7. A pipe coupling comprising two tubular members to be connected, a spring pressed check valve in the ends of each of said members, a coupling sleeve swiveled on one of said members and having threaded engagement with the other of said members, and a ring arranged between the ends of said members and having fingers adapted to act against said valves to open them as the coupling sleeve brings the members close together to make a tight joint.

8. A pipe coupling comprising two tubular members to be connected, a spring pressed check valve in the ends of each of said members, a coupling sleeve swiveled on one of said members and having threaded engagement with the other of said members, and a valve releasing ring arranged between the ends of said members.

9. A pipe coupling comprising valved members to be connected, a connecting and fastening member, and a device slidably arranged in said connecting and fastening member for positively opening both the valves as the members are coupled.

In testimony whereof I affix my signature.

CHARLES E. YATES.